UNITED STATES PATENT OFFICE.

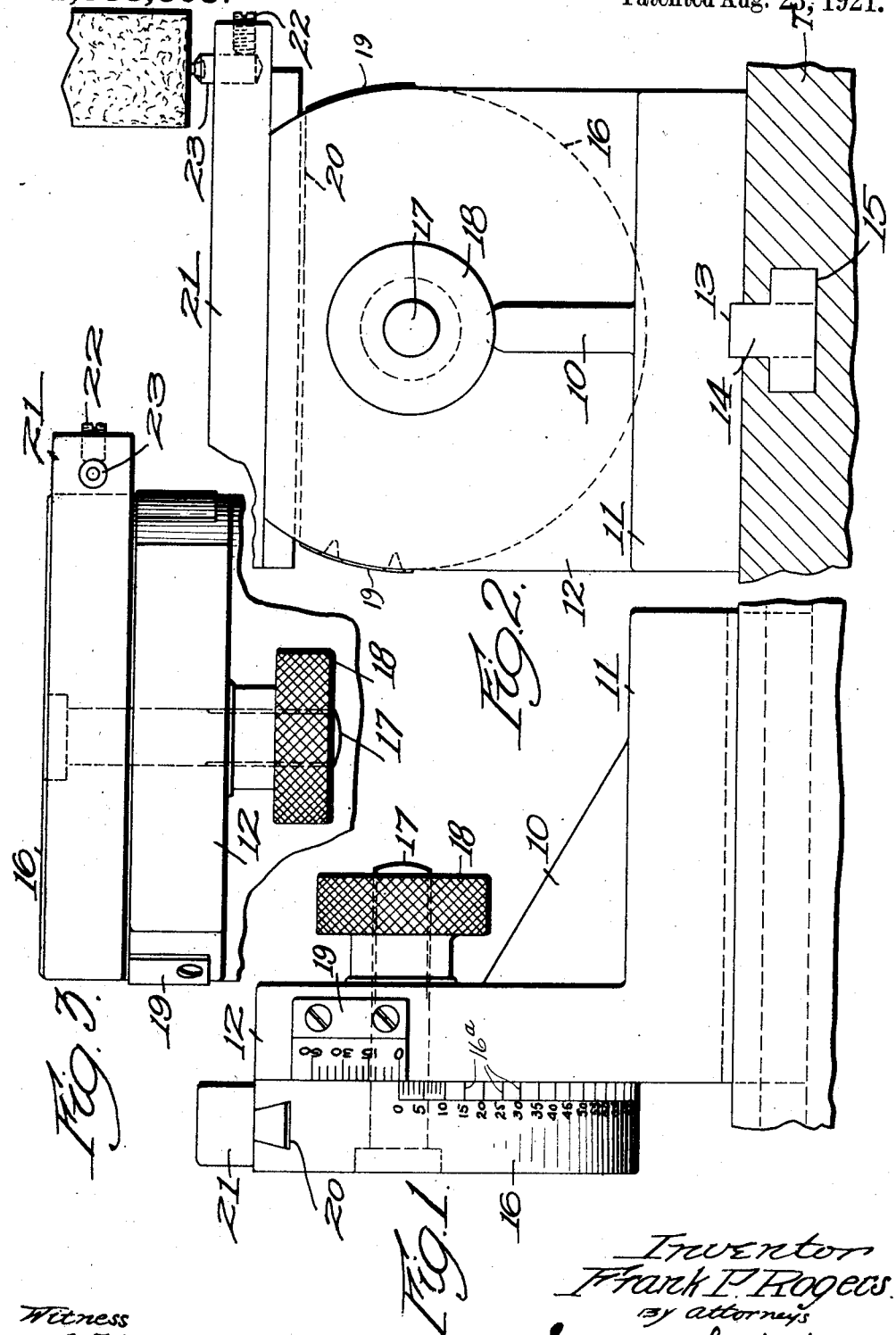

FRANK P. ROGERS, OF WORCESTER, MASSACHUSETTS.

DEVICE FOR DRESSING GRINDING-WHEELS.

1,388,308.

Specification of Letters Patent.    Patented Aug. 23, 1921.

Application filed January 8, 1920. Serial No. 350,115.

*To all whom it may concern:*

Be it known that I, FRANK P. ROGERS, a citizen of the United States, residing at Worcester, in the county of Worcester and State of Massachusetts, have invented a new and useful Device for Dressing Grinding-Wheels, of which the following is a specification.

This invention relates to a device for dressing grinding wheels by which the wheel may be provided with a face at a definite selected angle to its axis.

In certain classes of work it is necessary to use wheels with faces at certain exact and unusual angles, to produce the desired results, and it is the general object of my present invention to provide a wheel dressing device by which the desired angle may be attained with ease and certainty.

With this object in view, an important feature of my invention consists in the provision of a tool holding device slidably mounted in a support which may be adjusted so that the tool-holding device shall move at a definite desired angle to the axis of the grinding wheel.

Further objects of my invention relate to arrangements and combinations of parts hereinafter described and more particularly pointed out in the appended claims. A preferred form of my invention is shown in the drawings, in which—

Figure 1 is a side elevation of my wheel dressing device;

Fig. 2 is a front elevation thereof; and

Fig. 3 is a plan view thereof.

As shown in the drawings, my wheel dressing device comprises a base 10, having a portion 11 designed to rest upon the flat upper surface of a grinding machine table T, and having a second portion 12 with its finished outer face perpendicular to the lower face of the portion 11. The portion 11 is preferably provided with a groove or recess 13 fitting a block or key 14 which may be inserted in the table slot 15, thereby holding the base in definite angular position on the table. A disk 16 is angularly adjustable on the vertical face of the base portion 12, and may be clamped against the part 12 in adjusted angular position by means of a pivot bolt 17 and clamping nut 18.

The disk 16 is preferably provided with graduations 16ª coöperating with an index or zero mark which may be placed on a plate 19 secured to the portion 12 of the base 10.

As shown in the drawings, the disk is graduated in degrees and the plate 19 is provided with a vernier scale by which fractions of a degree may be read.

The disk 16 is provided with a guide way 20 in which a tool holding device 21 is mounted for free sliding movement, and provision is made for securing a wheel dressing tool therein. In the construction shown in the drawings, a hole is provided extending vertically into the device 21 from its upper side and a set screw 22 securely holds a wheel dressing tool or diamond point 23 in the hole.

Having described the construction of my improved wheel dressing device, the method of using the same will be apparent. The block 14 coöperating with the groove 13 holds the device in such a position that the slide 21 has a movement in a vertical plane parallel to the axis of the grinding wheel. The disk 16 is angularly adjusted on the base until the graduations indicate the desired angle between the face of the wheel and the axis thereof. The device is then adjusted forward or rearward until the center of the tool 23 is exactly under the axis of the wheel. The tool is then moved back and forth across the face of the wheel, the grinding machine table and wheel being relatively adjusted to cause the tool to approach the wheel.

In this way, the wheel can be given a straight face at the exact desired angle and use of the "cut and try" method heretofore common is thereby avoided.

The device may be used upon a grinding machine table or upon the surface of a magnetic chuck or other support having a flat plane surface and does not necessitate the removal of the chuck or support from adjusted position. This is frequently a great advantage.

Having thus described my invention, it will be evident that changes and modifications can be made therein by those skilled in the art within the spirit and scope of my invention as set forth in the claims, and I do not wish to be otherwise limited to the details herein disclosed, but what I claim is:—

1. A device for dressing grinding wheels having, in combination, a base with a vertical face, a graduated disk angularly adjustable about a pivot in said vertical face, means to secure said member in adjusted position against said face, said base having an index coöperating with the graduations of said disk to show the resulting angle of the wheel face, a tool holding device slidably mounted on said disk, and means to secure a wheel dressing tool to said device.

2. A device for dressing grinding wheels having, in combination, a base with two finished surfaces perpendicular to each other, a disk angularly adjustable on one of said surfaces and having a guide way formed therein, means to clamp said disk in adjusted position against said surface, a tool holding device freely slidable in said guide way, and means to hold a wheel dressing tool therein.

In testimony whereof I have hereunto affixed my signature.

FRANK P. ROGERS.